INVENTOR.
WELLINGTON W. PORTER.
BY
ATTORNEY

July 7, 1970  W. W. PORTER  3,518,818
PICKLING CUCUMBER HARVESTER
Filed Jan. 24, 1968  7 Sheets-Sheet 3

INVENTOR.
WELLINGTON W. PORTER.
BY
ATTORNEY

INVENTOR.
WELLINGTON W. PORTER.
BY
ATTORNEY

July 7, 1970 W. W. PORTER 3,518,818
PICKLING CUCUMBER HARVESTER
Filed Jan. 24, 1968 7 Sheets-Sheet 7

INVENTOR.
WELLINGTON W. PORTER
BY
ATTORNEY

United States Patent Office 3,518,818
Patented July 7, 1970

3,518,818
PICKLING CUCUMBER HARVESTER
Wellington W. Porter, R.D. 2, Dublin Road,
Waterloo, N.Y. 13165
Filed Jan. 24, 1968, Ser. No. 700,175
Int. Cl. A01d 45/00
U.S. Cl. 56—327     5 Claims

ABSTRACT OF THE DISCLOSURE

Pickling cucumber harvester having a transverse ground level vine cutter and sprocket and chain tines for sweeping cut vines upon conveying belts in a wide swath, the tines receding between the belts, a pair of stripping rolls, backed up by a pair of traction rolls disposed to pull the vines from the conveyor belts, and the lower of the separating rolls being smooth, and the traction and separator rolls having a peripheral velocity in the order of five times the conveyor belt speed to suddenly accelerate the vines, and thin them out so that the spacing between the separating rolls is close and whereby the pickling cucumbers are detached and prevented from passing between the separating rolls.

---

This invention relates to pickling cucumber harvesters and apparatus for separating pickling cucumbers from the vines.

The harvest of pickling cucumbers from low vines spread out over the ground has generally been effected on a manual basis. However the large vine leaves effectively hide the pickling cucumbers, especially the small more valuable sizes, and such harvesting tends to be uneconomical.

The present invention comprises apparatus adapted to remove the pickling cucumber vines from the ground in a six foot wide swath, sufficient to include three rows on two foot spacings. The apparatus lifts the vines from the ground, severing the vines from the roots at ground level before the roots offer resistance, and deliver the vines clean of roots in a layer to traction rolls adapted to accelerate the travel of the vines about five times to thin the vine layer, the traction rolls being immediately preceded by separating roll means adapted to prevent the passage of pickling cucumbers and snap such pickling cucumbers from their stems as have not already been detached in the acceleration and thinning of the vine layer.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

Figure 1:
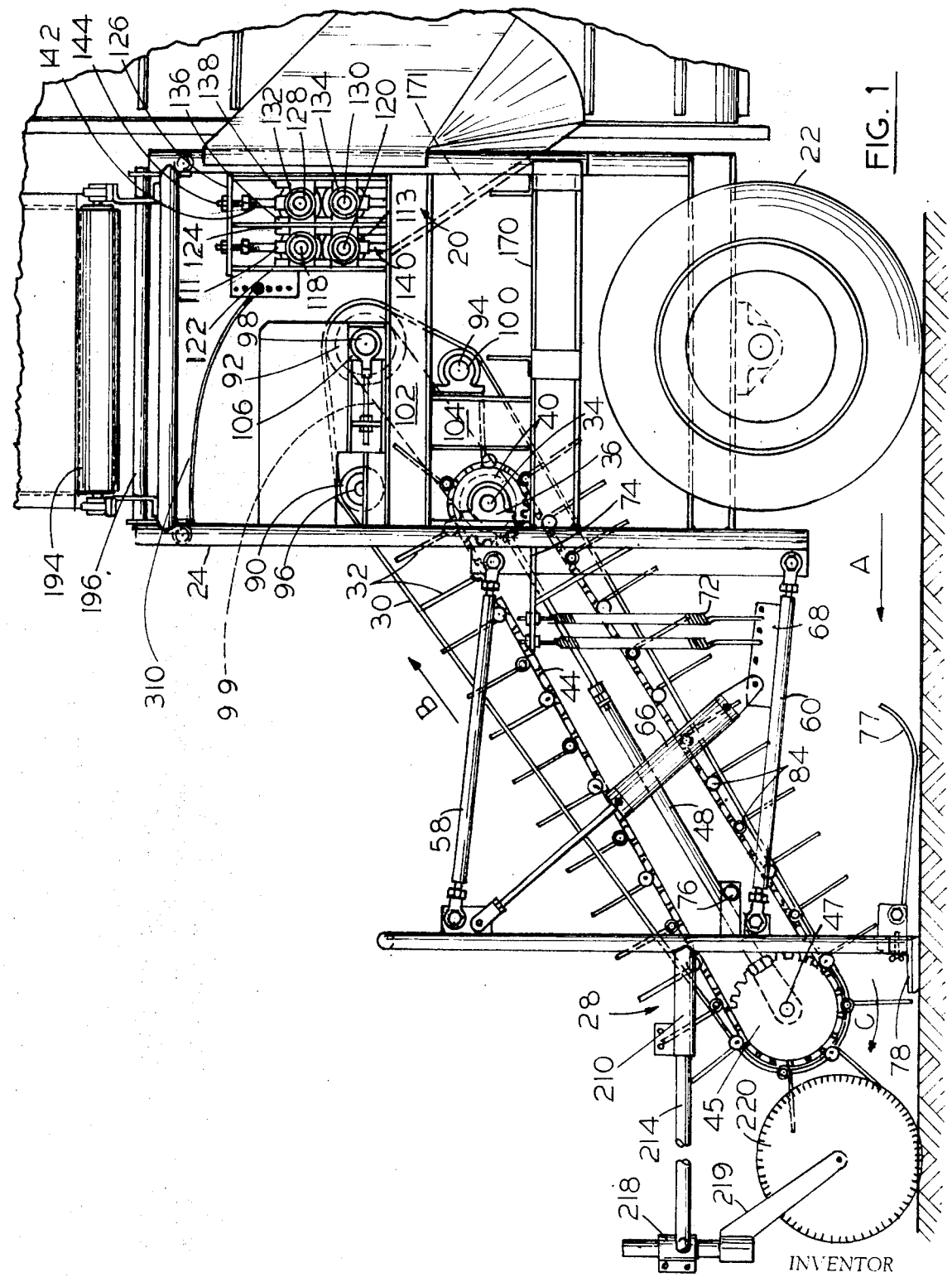
FIG. 1 is a side elevational view of the pickling cucumber harvester.
Figure 2:
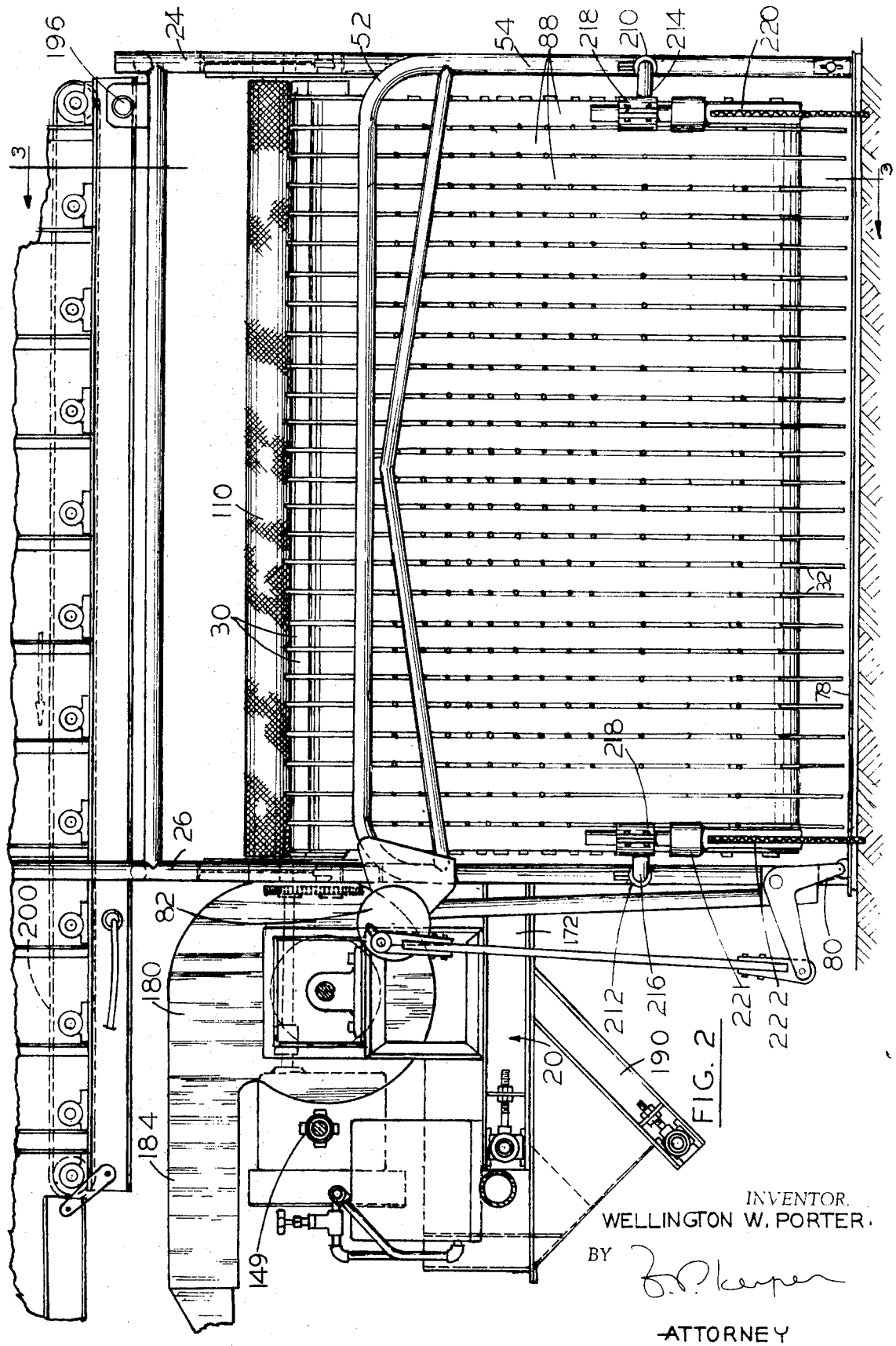
FIG. 2 is a front elevational view of the harvester.

Referring to FIG. 1 of the drawing, there is shown a transverse frame 20 supported above wheels such as 22, which frame is adapted to be drawn by a tractor in the direction of arrow A, the tractor and draw bar 15 being disposed on the far side of the machine, to avoid tractor damage to unharvested crop. The frame 20 is provided with a pair of suitably spaced substantially upright column members 24 and 26 affixed to and forming a part of the frame 20, as shown in FIG. 2. Between the uprights 24 and 26 is an endless tine and belt pick up apparatus for pickling cucumber vines, generally indicated at 28, the upper reaches of the belts 30 and tines 32 traveling in the direction of arrow B. The tine portion of the pick up apparatus is driven from a shaft 34 journalled in bearings 36 and 38 disposed on the back side of uprights 24 and 26, which shaft is provided with a pair of sprockets 40 and 42. Spaced sprocket chains 44 and 46 are driven by the sprockets 40 and 42 and extend downwardly and forwardly to a pair of sprockets, one of which is shown in FIG. 1 at 45, such sprockets being affixed to a shaft 47, journalled in the bearing ends of a pair of spaced adjustable struts 48 and 50 the upper ends of which are journalled on the shaft 34.

Figure 3:
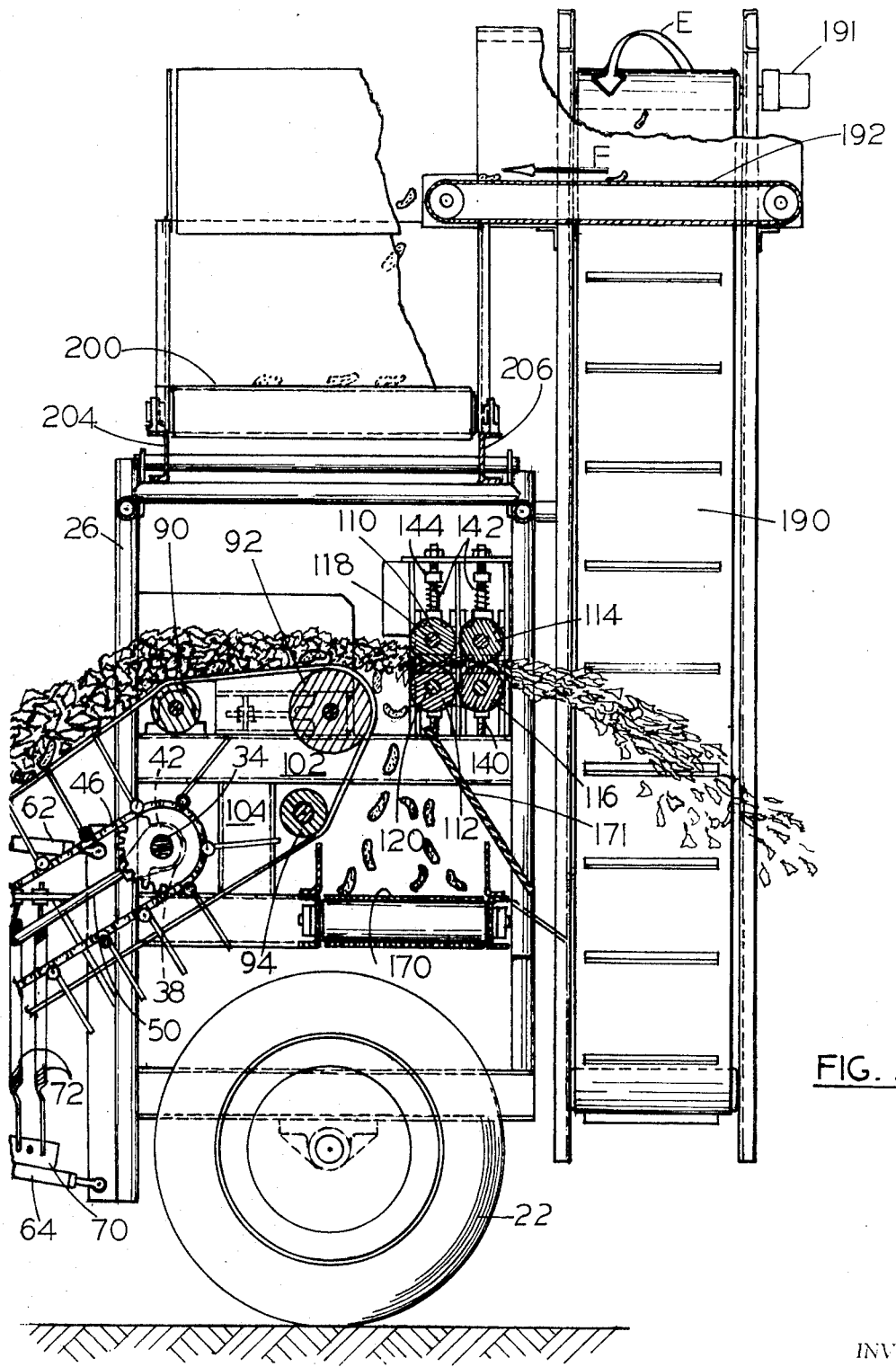
FIG. 3 is a fragmentary sectional view through the pickling cucumber and vine separation portion of the apparatus, taken substantially on the line 3—3 of FIG. 2.

A forward floating frame 52 of inverted U configuration has its side members 54 and 56 connected to the uprights 24 and 26 through two pairs of upper and lower adjustable links 58 and 60, on one side, and 62 and 64 on the other side (see FIG. 3). On each side, the forward frame 52 is adapted to be lifted or lowered in respect to the uprights 24 and 26 by cylinders such as 66, extending diagonally between the upper end of the respective side members 54 and 56 of frame 52, and plates 68 and 70 on the lower links 60 and 64. Counter balancing springs 72 on opposite sides extending to brackets such as 74 extending forwardly from the uprights 24 and 26 respectively are provided. A cross member 76 extending between the side members 54 and 56 universally supports the struts 48 and 50. An adjustable ground skid 77 is provided behind each side member 54 and 56.

Figure 5:
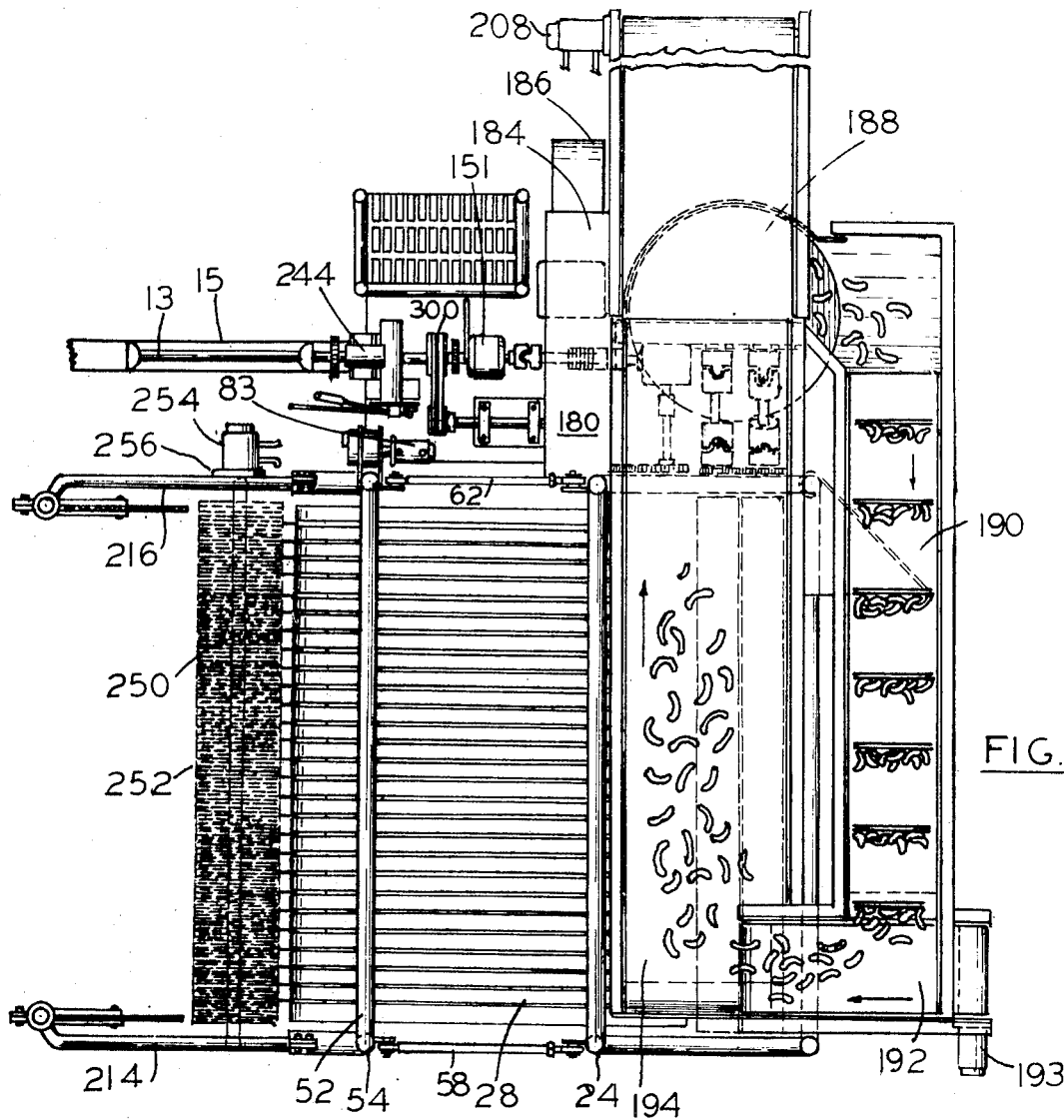
FIG. 5 is a schematic plan view with a rotary brush feature added.
Figure 6:
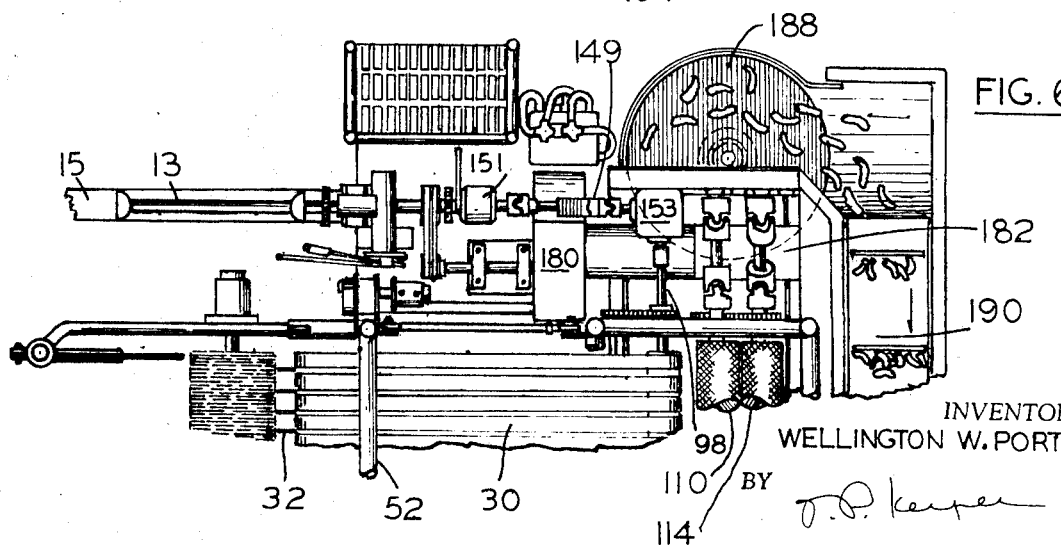
FIG. 6 is a fragmentary plan view with the upper conveyor removed.

Affixed to the lower ends of the side members 54 and 56 is a transverse cutter bar assembly 78 adapted to cut at ground level. Such cutter bar assembly is actuated by a bell crank and linkage 80 driven by a crank 82, which in practice may be driven by an hydraulic motor 83 (FIG. 5). The cutter bar assembly may preferably correspond to that shown in U.S. patent granted to Wellington W. Porter, No. 2,706,374 and issued Apr. 19, 1955.

Mounted on the sprocket chains, at fixed intervals, are transverse bars 84 to which are applied spring tines 32, the tines being in pairs and uniformly spaced along each bar. Disposed between each pair of adjacent tines is a belt such as 88 which rides around the bars 84 as they pass around the lower sprockets and over idler pulleys 90, and 94, and drive pulley 92 disposed on shafts 96, 98 and 100 journalled in the frame 20 in bearings mounted on transverse and upright members such as 102 and 104 disposed behind each upright 24 and 26. The bearings such as 106 are adjustable.

Much of the constructional details in regard to the sprocket chains and tine bars have been avoided herein, since the floating frame 52, and mounting of the sprocket shafts, and tine mounts on the bars are shown in previous U.S. patents granted to Wellington W. Porter, as for example 2,729,049 issued Jan. 3, 1956, 2,674,838 issued Apr. 13, 1954, and 2,614,379 issued Oct. 21, 1952, the difference in the present apparatus being in the reversed rotation of the sprockets, and the tine stripping action occurring in respect of the upper reaches of the belts, instead of underneath, as heretofore, whereby the harvest is carried on the upper portions of the belts, instead of being propelled up a ramp beneath the gathering means.

With the sprockets rotating clockwise under power applied to shaft 34, as seen in FIG. 1 or 3, as the apparatus moves forward in the direction of arrow A, the cutter 78 will sever the vines from their roots at ground level in time for the tines in moving in the direction of arrow C, to sweep and lift the vines off the ground, and propel the vines while being carried along the upper reaches 30 of the belts. It will be seen that as the upper reaches 30 of the belt approach the idler pulleys 90, the tines recede below the belt, by reason of the difference in inclination between the chain and the reaches 30 of the belts. The vines and pickling cucumbers are thereupon carried along the relatively level stretches of the belts between idler 94, and drive pulley 92. In practice the belts are driven by power applied to the drive pulley shaft 98. The sprockets shaft 34 is suitably driven from shaft 98 by sprockets and chain 99. The ratio is such that the peripheral velocity of the rolls 92 is about 1% greater than the velocity of the sprocket chains 44, so as to maintain the upper reaches of the belts taut, and provide a cleaning action of the belts in respect to the flight bars and pulleys by reason of the slight difference in speed.

Disposed at a short distance behind the idler pulley 92, is the vine and pickling cucumber separating mechanism, comprising a lower smooth roll 112 and upper roll with traction tread 110, and two traction rolls 114 and 116 with traction tread. The opposite ends of the shafts 120 and 118 of rolls 112 and 110 are journalled in bearings 113 and 111 arranged for vertical adjustment in vertical angle iron guides 122 and 124 of the bearing frame 126, and the opposite ends of the shafts 128 and 130 of the traction rolls 114 and 116 are likewise journalled in adjustable bearings 132 and 134, arranged in angle iron guides 136 and 138 of the frame 126. The lower bearings 134 and 113 are raised or lowered by screws such as 140, and the upper bearings 111 and 132 are yieldingly urged downwardly by coil compression springs such as 142, the pressure of which can be adjusted by the nuts such as 144. It will be seen that the forward pair of rolls are spaced from the rear traction rolls so as to avoid interference, the upper rolls of each pair rotating counterclockwise, while the lower rolls of each pair rotate clockwise, as seen in FIGS. 1 and 3. The frames 126 may be adjustable fore and aft (not shown).

Each of the rolls except the upper traction roll 114 may be driven through universal joint linked drive shafts such as 150, driven at uniform speeds by power from a tractor take-off 13, driving through a manually operated reversing gear and clutch 151, universal joints 149, a bevel or miter gear box 153 and a sprocket and chain drive 155 driven by sprocket 290 affixed to shaft 98. In practice, it has been found practical to drive the upper and lower rolls 110 and 112, and lower roll 116 while allowing the upper roll 114 to roll free, the roll being under spring pressure, so as to bear against roll 116, or upon vines passing between. Roll 112 may be driven from the shaft of roll 116 by a sprocket and chain 157.

Referring to FIG. 3, it will be seen that the smooth lower roll 112 and traction roll 110 above receive the vine stems and leaves, but snap or shake off the pickling cucumbers before or as the vines enter between the rolls 110 and 112. Since the lower roll is smooth, in fact preferably polished, or of stainless steel, no harm is done to any pickling cucumber which is snapped off by roll contact, and the rolls 110 and 112 operate to prevent the passage of pickles therethrough, by reason of the resilient compression applied to the upper roll 110 and the close spacing therebetween, due to the thinned layer of vines. As a matter of fact, the flexing of the mass of vine and leaves in being accelerated and in preparing to enter between the rolls 110 and 112 eliminates most of the pickling cucumbers, few having contact with the roll 112 directly.

In practice the lineal speed of the pick up belts will be about one fifth of the lineal speed of the rolls 110, 112 and 114 and 116, the velocity of the belts being in the order of 180 feet per minute, while the rolls 112 and 116 are driven clockwise and the roll 110 driven counterclockwise at like speeds between 800 to 1000 revolutions per minute. Since the roll diameters are about 5 inches in diameter it will be seen that the vines are caused to be stretched out, accelerated and thinned out as they leave the belts and pass through the rolls, and since the layer is thinned out, the rolls 110 and 112 are too close to permit the passage of pickling cucumbers, and the pickling cucumbers are snapped off without the stems.

Since the roll 112 is smooth, traction is afforded only by the upper roll 110 to draw the vines therethrough to initiate the passage of the vines into the rolls. The layer of stems and leaves, however, after leaving rolls 110 and 112 enter between traction rolls 114 and 116. Such rolls are provided with a vulcanized rubber and canvas tread known as Goodyear Diamond tread, which grips the vines and draws the vine leaves and refuse through the rolls 114 and 116 for discharge upon the ground to the rear of the apparatus. Some of the refuse such as stems and leaves may fall between the front rolls and rear rolls on apron 171.

Figure 4:
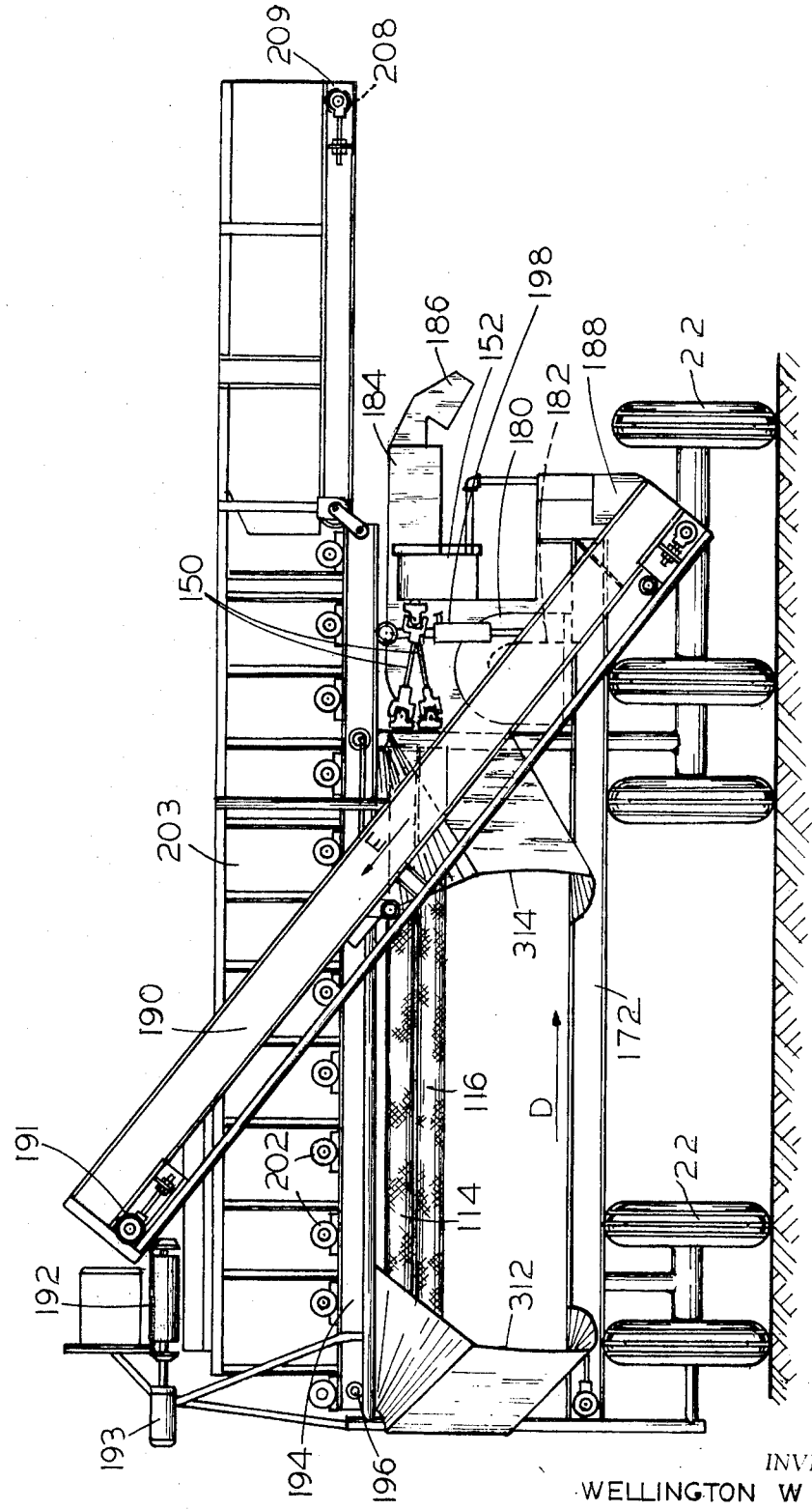
FIG. 4 is a rear view of the apparatus.

As can be seen in FIG. 3, the pickles drop upon the bed 170 of a transverse conveyor 172 which conveys the pickling cucumbers in the direction of arrow D, in FIG. 4. The conveyor bed comprises an endless grid, preferably formed of flexible mesh of the type disclosed in copending application of Wellington W. Porter Ser. No. 545,623 filed Apr. 27, 1966, but of a mesh of about a half inch. Disposed above the conveyor to one side of the pick up apparatus is a blower 180 having an intake 182 disposed across and about four inches above the conveyor bed. Such blower is provided with a discharge duct 184 adapted to carry the debris lifted by suction from the conveyor mesh to the side of the apparatus and discharges the same as by the deflecting hood 186.

The end of the conveyor discharges upon a rotary transfer disk apparatus 188, which transfers the pickling cucumbers to the elevator 190, which in turn discharges in the direction of arrow E upon a short belt conveyor 192 acting in the direction of arrow F to discharge pickling cucumbers upon the bed of a conveyor 194 disposed above the roll separator and accelerating apparatus. The left hand end of the conveyor 194, as seen in FIG. 4, is pivoted on a cross shaft 196, so that its other end can be raised through action of a hydraulic lift cylinder indicated at 198. The conveyor belt 200 of the conveyor 194 which may be of the half inch mesh variety referred to, is supported at frequent intervals on rollers journalled in bearings 202 disposed along the side angle irons 204 and 206 of the conveyor. When a substantial harvest has been discharged upon the bed or belt of the conveyor 194, while normally not in motion, the right hand end of the conveyor, as seen in FIG. 4 may be elevated to clear a truck driven on the field, and the belt 200 set in motion in the direction of arrow G as by a hydraulic motor on the end of shaft 208, and the harvest collected on the conveyor is thereby discharged from the end 209 into the truck.

Extending forward of the frame 52 from the side members 54 and 56 are sockets 210 and 212 in which are adjustably mounted support arms 214 and 216 having sockets 218 at their forward ends to receive rearwardly inclined bearing supports 219 and 221 for vine slicing disks 220 and 222, such disks having hardened sinuous cutting peripheries, adapted to dig into the ground sufficiently to cut all vines extending across the path of travel of the slicing disks. On an initial pass over a vine covered field both disks 220 and 222 will be employed, but as soon as one pass has been completed, so that the vines harvested on the second pass are bordered by the previous pass where the vines have been cut and harvested, as for example to the left of disk 222 as seen in FIG. 2, the disk 222 and its arm 216 may be removed as no longer necessary, and only disk 220 employed. Such disk acts to sever vines extending crosswise into the path of harvest from roots outside of the path covered by the cutter apparatus 78. Thus the vine sweeping action of the tines 32, just forward of the cutter apparatus 78, always acts on vines which have been cut from their roots lying laterally beyond the harvest path, or which will be cut from their roots by the cutter apparatus 78, before any resistance to the vine pick-up operation due to roots can take place. In fact by lifting the vines before cutting, the rooted stems are disposed for more effective cutting action, and by proper location of the cutter in regard to the sweep of the pick up tines, the tines and cutter cooperate with one another to free the vines before resistance to pick up can occur.

Figure 7:
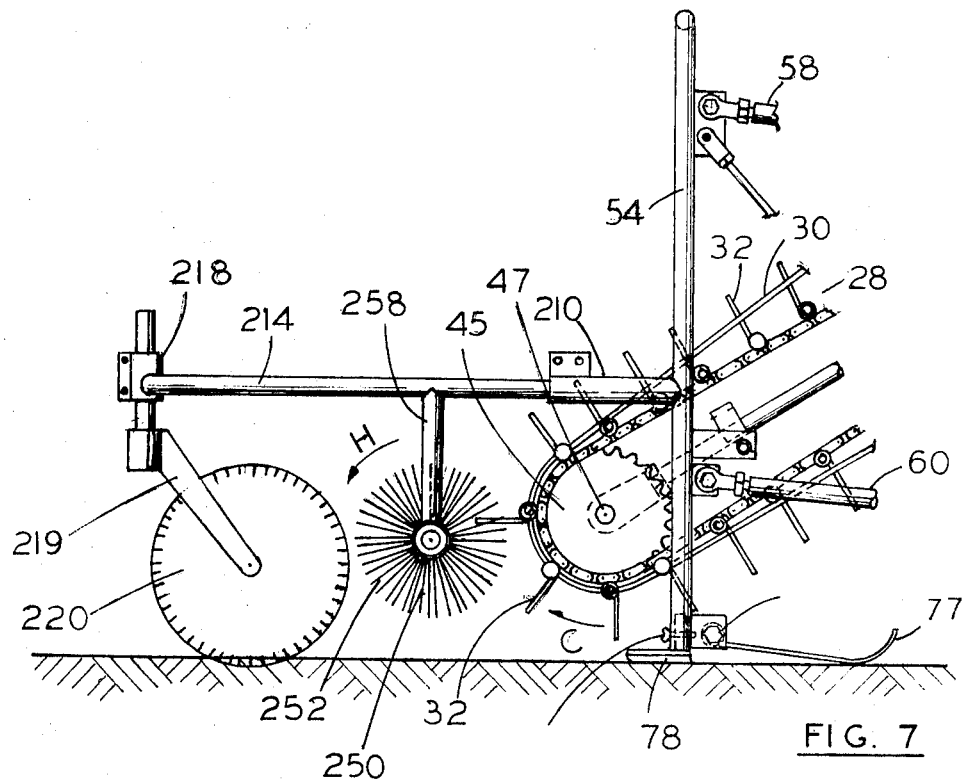
FIG. 7 is a fragmentary schematic side view of the rotary brush arrangement of FIG. 5.

In FIG. 5, a schematic view of the apparatus is indicated. There shown is the drawbar 15 and the power take off driven shaft 13 which are coupled to a tractor. The power take off shaft drives a hydraulic pump located in the area indicated at 244 from which the various hydraulic motors derive their power. In FIG. 5, there is shown a feature further illustrated in FIG. 7 comprising a brush like compactor 250 to assist the lay of vines caught by the tines to travel upwardly around the lower ends of the belts as they travel about sprockets 45. Such brush may have relatively stiff nylon bristles 252 and the brush is rotated by a hydraulic motor 254 in the direction of arrow H. The brush is rotatably supported in bearings such as 256 disposed on the lower ends of arms such as 258, depending from each of the extensions 214 or 216. While such compactor may improve the operation, the apparatus may be effectively used without it.

Figure 8:
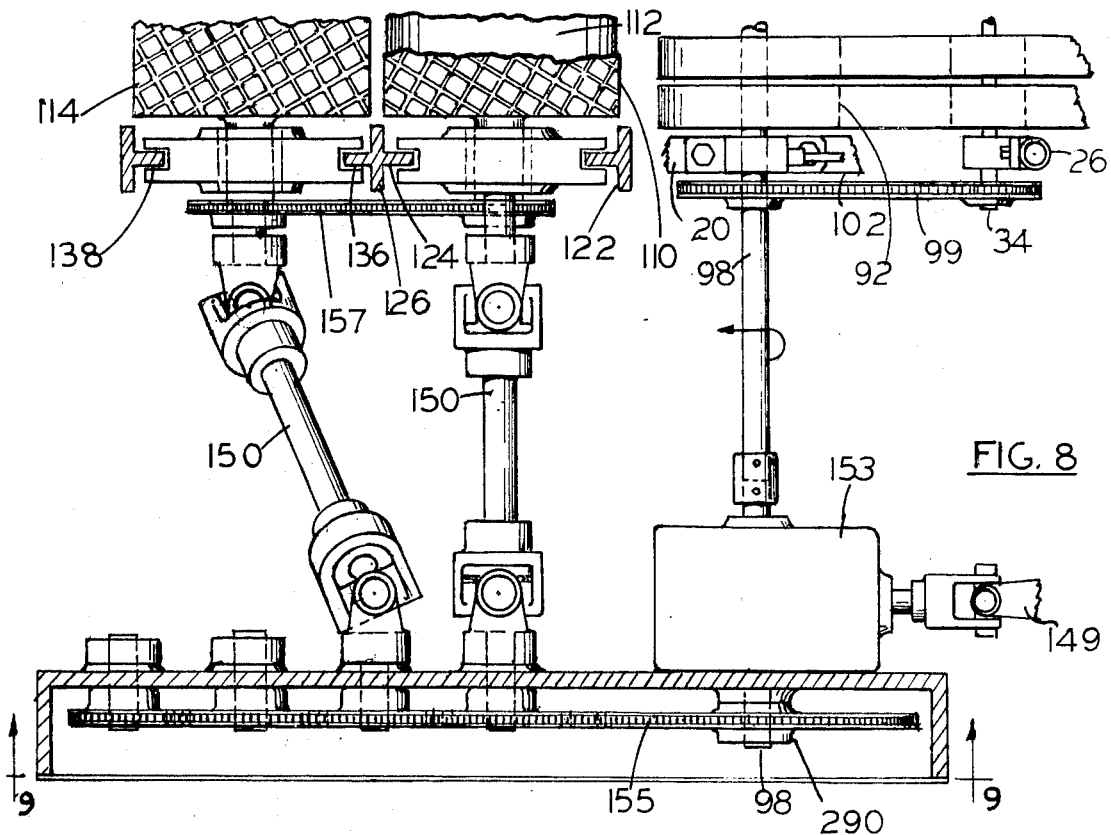
FIGS. 8 and 9 are schematic fragmentary plan and end views of the roll and pick up conveyor drives.
Figure 9:
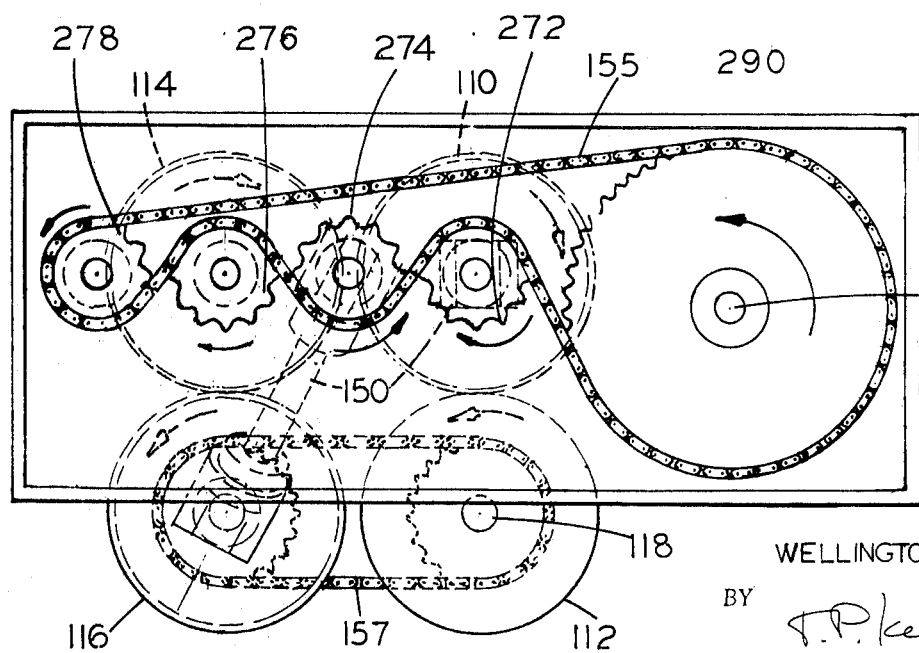

In FIG. 8, there is diagrammatically illustrated a drive for the rollers 110, 112 and 116, the drive being derived by universal joint connections such as 150 extending between the roll shafts 118 and 130 and the sprocket shafts 272 and 274 respectively which are reversely driven by the sinuous chain drive 155 driven by sprocket 290 which may be affixed to shaft 98.

The lower roll 112 is driven from the shaft 130 at the same speed, by a sprocket and chain drive 157. The idlers 276 and 278 serve to tension the chain 155.

In practice, the harvester may be drawn at a speed of about 135 feet per minute or more, while the belts 30 travel at a somewhat higher speed, the tines 32 sweeping the vines forward as they are cut from the roots by the reciprocating cutter 78. The thick layer of cut vines pass around the front of the sprockets 45, and travel up the conveyor as indicated in FIG. 3, the tines 32 having receded to release the flow of vines into the pair of stripper rolls 110 and 112, which are yieldingly urged toward each other by the coil springs 142, the upper roll rotating counterclockwise, and the lower roll rotating clockwise. The vines then pass through the traction rolls the lower roll 116 of which rotates at the same speed as roll 112, and the upper roll of which rolls free but is spring pressed to grip the vines and thus rotates counterclockwise at approximately the speed of the lower roll. The peripheral velocities of the rolls are about five times the speed of the belts 30 and the delivery of the vines to the rolls, hence it will be seen that the thick layer of vines and pickling cucumbers are suddenly accelerated and thinned out as they leave the conveyor. Hence the rolls 110 and 112 are allowed to approach so close so as to prevent pickling cucumbers to pass, and such pickling cucumbers as are not dropped off by the sudden acceleration, and the interfering vines as they are speeded up and thinned down, are knocked off by the smooth roll 112 before they can pass into the rolls. It will be seen that the smooth roll cannot provide traction to accelerate the vines, but once entangled vines reach the traction rolls 114 and 116, the rolls 110 and 112 are practically relieved of any traction friction. The pickling cucumbers drop upon the conveyor 170, and the shield 171 assures that the twigs and loose material between the two pairs of rolls will be delivered rearwardly of the conveyor 170 while the stripped vines pass through the rolls 114 and 116 and are ejected rearwardly.

It will be seen that the rolls, and stripper belts and tines are driven from a common shaft 98 in turn driven from the tractor power take off through a reversing gear 151. Should the rolls become wound up with vines, and need to be cleared, the reverse gear 151 can be manually actuated to rotate the rolls backward to unwind the collection. The apparatus operates effectively on vines which may be largely interspersed with weeds. Any necessity for weeding the vines before harvest is practically rendered unnecessary since the weeds travel with vines, and by the acceleration at the rolls, the weeds are thinned out with the vines and pass through the traction rolls.

In FIG. 5, it will be seen that the blower 180 may be also driven by the tractor take off directly as at 300, ahead of the reverse 151. The various conveyor motors and other hydraulic motors may be arranged in a series circuit to be driven from the pump 244, and speed of any one may be varied by a manually controlled bypass valve around each motor. A suitable deflector such as the shield 310 in FIG. 1 is provided to direct the vines toward the rolls. Also shields 312 and 314 are provided, see FIG. 4, to assure that the discharged vines are directed to the ground from which the vines were taken. It will be appreciated that the flexible mounting of the forward frame 52 permits the cutter to cut at ground level across its entire width so that all vines are lifted for processing.

While a single modification of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A mobile pickling cucumber harvester comprising means for lifting a wide swath of cucumber laden vines from the ground while cutting the vines across the width of the swath from their roots at ground level, including means for moving said vines at a uniform rate upwardly and rearwardly of the harvester in a layer to a separating area and level separating plane, a pair of separating rolls comprising a lower smooth roll having its upper surface tangent to said plane, and an upper driven roll disposed vertically above the smooth roll, means to yieldingly urge said upper roll towards the lower roll, a pair of traction rolls disposed immediately behind said separating rolls comprising a lower roll whose upper surface is substantially tangent to said plane, and an upper roll disposed vertically above the lower roll, means independent of said separating rolls for yieldingly urging said traction rolls together, one of said traction rolls having a canvas tread, means for driving said traction rolls, and the upper of said separating rolls at a peripheral velocity approximately five times the uniform rate of said vine moving means, whereby to separate the pickling cucumbers from the vines in the acceleration of the vines thereof, and to provide a substantially horizontal layer of vines entering between the separation rolls sufficiently thin as to allow the separation rolls to operate at a spacing less than the size of the pickling cucumbers harvested.

2. A harvester according to claim 1 wherein the lifting and cutting means and moving means comprises forward and rearward sprocket shafts each having a pair of spaced sprockets and having spaced sprocket chains, and transverse bars having tines affixed to said chains at uniformly spaced intervals, said forward sprocket shaft being located at a height above ground level to permit the tines to sweep close to the ground forwardly about the forward sprockets, and wherein the cutting means is disposed below the forward sprocket shaft.

3. A harvester according to claim 2 wherein the forward sprocket shaft and the rearward sprocket shaft are journalled in a forward frame and a rearward frame respectively, and in which the forward frame is swively connected to the rearward frame.

4. A harvester according to claim 2 wherein a plurality of conveyor belts extend around the bars of the sprocket chains as they move around the forward sprockets, and wherein said belts are supported on idler pulleys disposed above and to the rear of said rearward sprocket shaft, whereby the upper reaches of said belts move away from said sprocket chains and said bars and tines as the belts move upward and rearwardly toward the separating area.

5. A harvester according to claim 1 wherein the means for moving said vines comprises a plurality of conveyor belts.

References Cited

UNITED STATES PATENTS

| | | | |
|---|---|---|---|
| 1,715,218 | 5/1929 | Wright et al. | 171—28 XR |
| 2,588,764 | 3/1952 | Richmond | 56—327 |
| 2,729,049 | 1/1956 | Porter | 56—364 |
| 2,732,678 | 1/1956 | Blaser et al. | 56—364 |
| 2,829,484 | 4/1958 | Gilbert | 56—327 |
| 2,911,978 | 11/1959 | Morrison | 130—30 |
| 3,086,344 | 4/1963 | McCarty. | |
| 3,182,437 | 5/1965 | Ramacher et al. | 56—328 |
| 3,377,785 | 4/1968 | Kessler. | |
| 3,387,611 | 6/1968 | Looker | 171—28 |

RUSSELL R. KINSEY, Primary Examiner